April 5, 1960     L. T. CAMPBELL     2,931,478
HYDRAULIC ARRESTOR FOR INCLINED RAMP Filed Aug. 23, 1957     3 Sheets-Sheet 1

INVENTOR.
LOUIS T. CAMPBELL
BY Donald G. Dalton
ATTORNEY

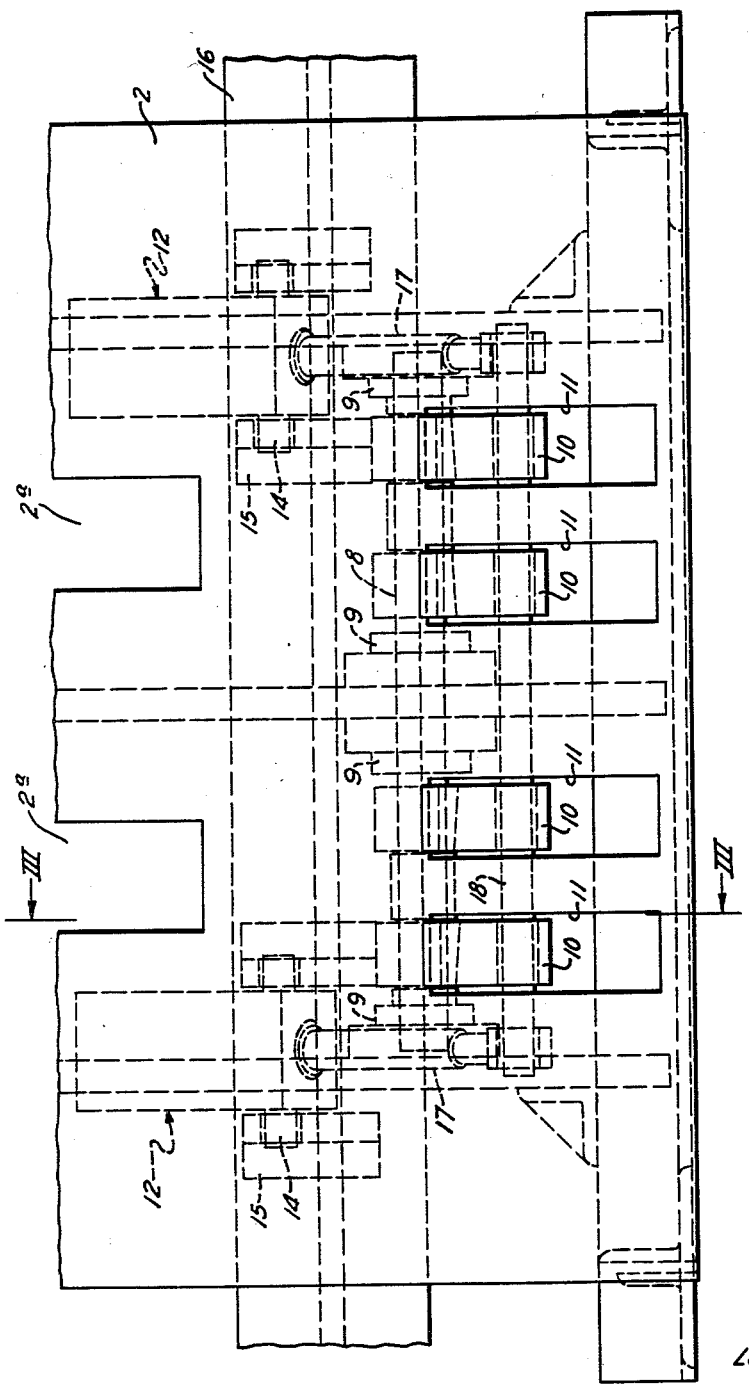

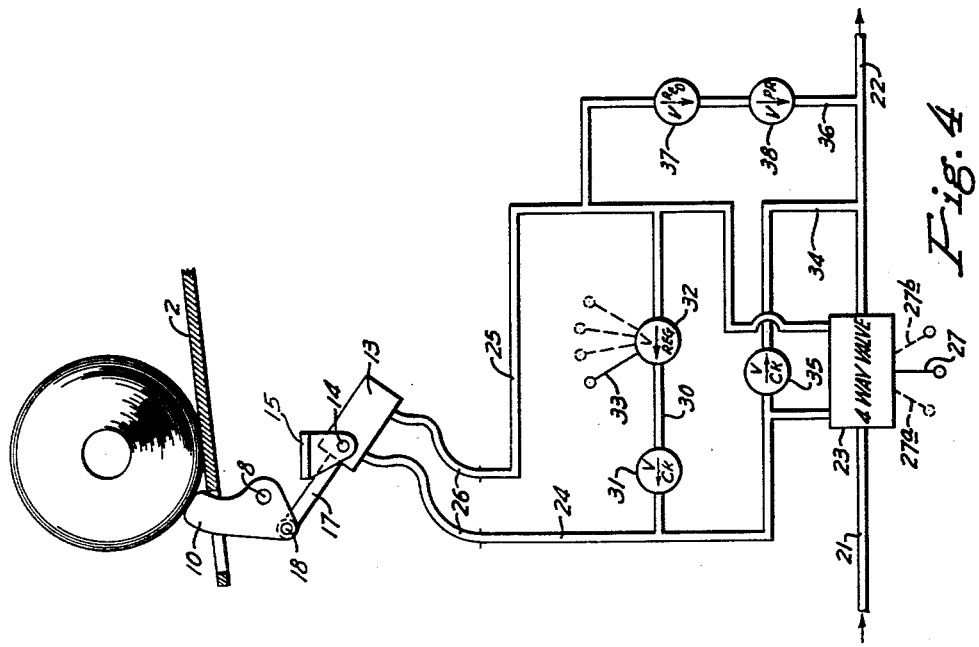
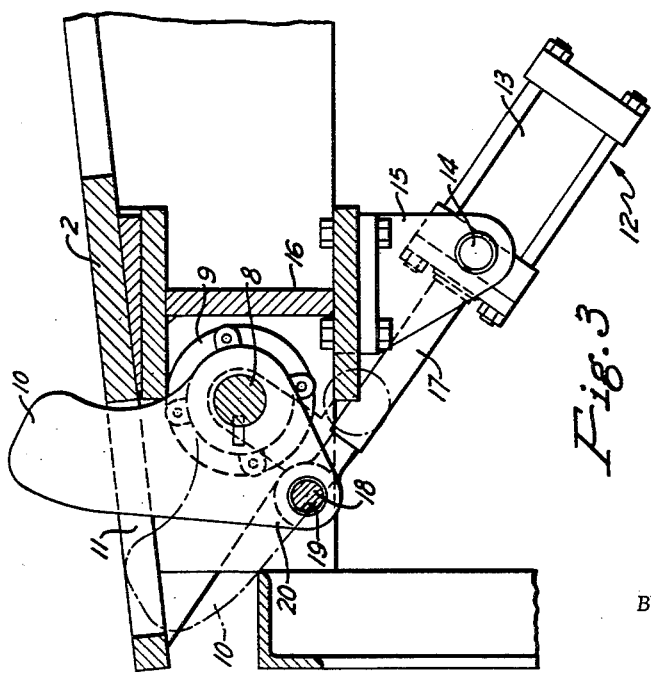

United States Patent Office 2,931,478
Patented Apr. 5, 1960

2,931,478

HYDRAULIC ARRESTOR FOR INCLINED RAMP

Louis T. Campbell, Morrisville, Pa., assignor to United States Steel Corporation, a corporation of New Jersey Application August 23, 1957, Serial No. 679,947

2 Claims. (Cl. 193—40)

This invention relates to an apparatus for decelerating the movement of a cylindrical article as it rolls over a downwardly inclined ramp. More specifically it relates to an apparatus for slowing the movement of a coil of metal strip over a ramp to a charging buggy for an uncoiler at the entry end of a strip processing or shearing line. In a manner to be described, it provides an hydraulic system for absorbing momentum or kinetic energy from a coil or other article being retarded.

Processing or shearing lines for metal strip are commonly provided with an uncoiler at the entry end thereof which is supplied with coils of strip by a charging buggy, the coils being delivered to the charging buggy by rolling over a downwardly inclined ramp on which they are placed by an intermittently operable conveyor. The momentum or kinetic energy imparted to the coils as a result of their emplacement on and downward movement over a delivery ramp in this manner subjects the buggy to impact of a nature that causes damage and necessitates frequent and costly maintenance.

One of the principal objects of this invention is to provide an apparatus for delivering coils of strip to a charging buggy for a strip uncoiler that will eliminate impact damage of this character. A further and related object is to provide an apparatus for slowing the downward rolling movement of a coil of strip or other cylindrical article over a delivery ramp. A still further object is to provide in an apparatus of this character an hydraulic system that will absorb kinetic energy from an article gravitating over the delivery ramp to thereby slow its movement into a charging buggy or other receiving station.

Other objects and advantages of the invention will become apparent from the following description:

In the drawings, there is shown a preferred embodiment of the invention. In this showing:

Figure 2 is an enlarged plan view showing the manner in which the apparatus of this invention is applied to the ramp of Figure 1;

Figure 3 is a sectional view taken substantially along the line III—III of Figure 2; and Figure 4 is a diagrammatic showing of an hydraulic system for controlling the operation of the apparatus shown in Figures 2 and 3.

Figure 1:
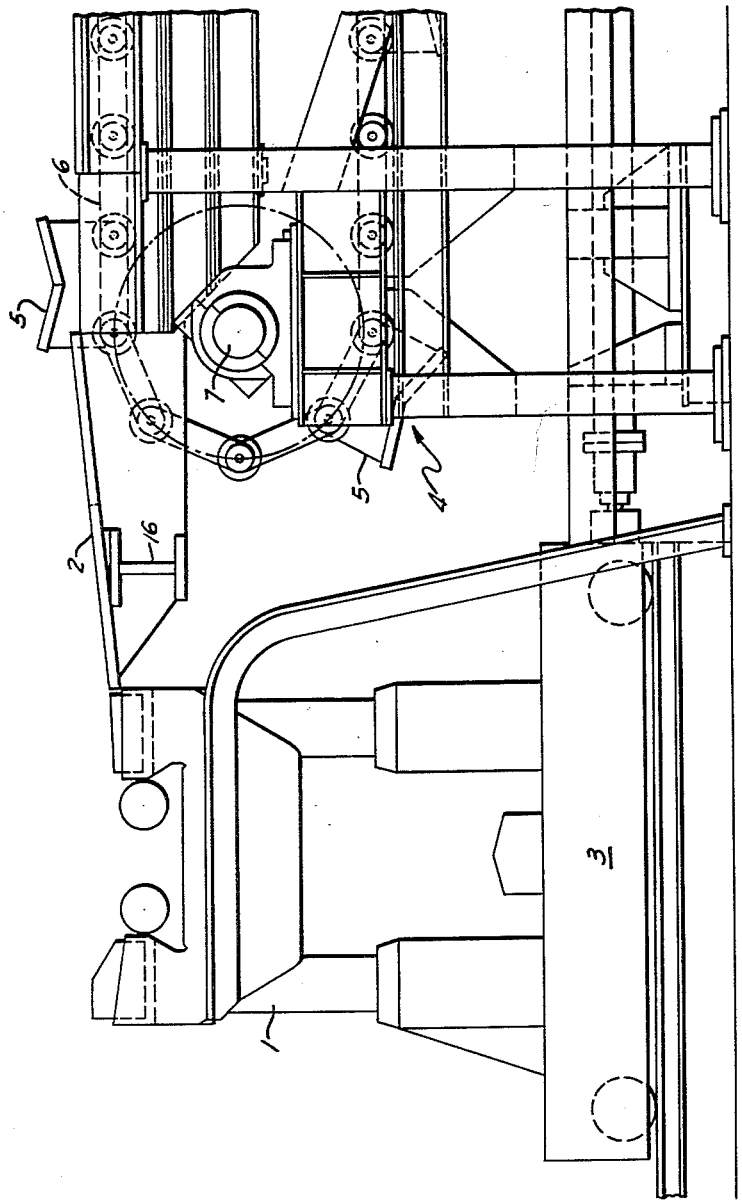
Figure 1 is a fragmentary and somewhat diagrammatic view showing in side elevation a conventional arrangement of a delivery ramp between a coil supply conveyor and a charging buggy for an uncoiler.

In Figure 1 of the drawings, a charging buggy 1 is shown in position for receiving a coil of metal strip from an inclined ramp 2. The buggy 1 has a carriage 3 supporting it for movement to the left as viewed in Figure 1 to an operative charging position with respect to a strip uncoiler (not shown) at the entry end of a processing line that may have either a recoiler or shears at the other end thereof. Coils are delivered to the ramp 2 by a conveyor 4 that has coil supporting pallets 5 carried by conveyor chains 6. The chains 6 are rotated by drive sprockets (not shown) on a shaft 7 at one end of the conveyor to deposit coils on the ramp 2, slots 2a being provided at the upper end of the ramp through which the chains 6 and pallets 5 rotate in a downward direction. By reason of its downward inclination, coils deposited on the ramp 2 roll to its lower end and onto the charging buggy 1. As indicated above, the momentum or kinetic energy imparted to the coils by emplacement on the ramp 2 and during their gravitational rolling movement thereover results in a heavy impact as they come to rest on the buggy 1. The structure thus far described is conventional and forms no part per se of this invention, which is directed to an apparatus for decelerating the movement of coils rolling downwardly over the ramp 2.

Such apparatus, as best shown in Figures 2 and 3, includes a shaft 8 extending transversely of the ramp 2 at the lower end thereof and supported for rotational movement in bearings 9. A plurality of stops 10, preferably four in number, are secured by keys to the shaft 8 at spaced intervals along its length for rotation therewith. This mounting of the stops 10 provides for their rotational movement about the axis of the shaft 8 between the erected and retracted positions respectively shown in solid and broken lines in Figure 3 of the drawings. In their erected positions, the stops 10 are in the path of movement of coils rolling over the upper surface of the ramp 2 and are effective, in a manner to be described, to either stop or slow such movement and, in their retracted position, are out of such path of rolling movement. Elongated openings 11 in the ramp 2 provide for movement of the stops 10 between their erected and retracted positions.

Rotation of the shaft 8 and thereby movement of the stops 10 between their erected and retracted positions is regulated by a pair of hydraulic expansible chamber motors 12. Each of the motors 12 has an operating cylinder 13 with trunnions 14 projecting from opposite sides thereof and supporting it for rocking movement in brackets 15 depending from the supporting framework 16 for the ramp 2. Piston rods 17 projecting from the cylinders 13 have pivotal connections with opposite ends of a shaft 18 that forms a common operating connection for the stops 10. Such connection is effected by the shaft 18 extending through aligned openings 19 in the outer ends of crank arms 20, which are integrally connected with but radially displaced from the stops 10. The stops 10 and the arms 20 integrally connected therewith in effect form bell-crank levers, the rotation of which about the axis of the shaft 8 is regulated by the motors 12. Operation of the motors 12 to move the piston rods 17 to and from extended positions relative to their operating cylinders 13 controls the movement of the stops 10 between their erected positions, shown in solid lines, and their retracted positions, shown in dotted lines, in Figure 3 of the drawings.

The motors 12 are preferably double-acting and are connected in parallel in a common hydraulic system, shown diagrammatically in Figure 4 of the drawings, which includes a fluid supply line 21 and a fluid exhaust line 22. A 4-way valve 23 controls the connections of the lines 21 and 22 with respect to conduits 24 and 25 that are connected to opposite ends of each cylinder 13 through flexible hoses 26. The valve 23 is conventionally constructed and may be one of any suitable type having three operating positions selected manually by operation of a control lever 27 as follows: a hold position with the lever 27 in the central position shown in solid lines in which the valve 23 disconnects both lines 21 and 22 from the conduits 24 and 25 and blocks the flow of fluid from both ends of the cylinder 13; a first operating position with the lever 27 in the position designated 27a in which the valve 23 connects the conduit 25 with the supply line 21 and the conduit 24 with the exhaust line 22 to move the piston rod 17 to its extended position and thereby the stops 10 to their erected positions; and, a second operating position with the lever in the position designated 27b in which the valve 23 reverses the connections of the conduits 24 and 25 with the lines 21 and 22 to move the piston rod 17 to its retracted position and thereby lower the stops 10 to their retracted positions. The lever 27 preferably has a spring bias (not shown) such that it automatically moves to the hold position shown in solid lines in Figure 4 when released by an operator after movement to one of its operating positions 27a or 27b.

As indicated above, the apparatus of this invention operates to absorb kinetic energy from an article rolling downwardly over the ramp 2 to thereby yieldingly resist and slow its movement. This is accomplished by providing a by-pass conduit 30 between the flow conduits 24 and 25. A check valve 31, preferably one having an adjustable spring bias, in the by-pass conduit 30 confines movement of fluid therethrough to a direction from right to left as viewed in Figure 4, and an adjustable regulating valve 32 therein controls the rate of fluid flow and thereby its hydraulic resisting action. While any conventionally constructed regulating valve that is adjustable to provide a given rate of flow for different pressure heads may be used, the valve 32 is preferably a needle valve having a needle adjustable to different positions controlling the effective size of an orifice therein, and a manual control lever 33 for effecting its adjustment from a closed position to open positions of progressively increasing effectiveness. As the lever 33 is moved clockwise from the position shown in solid lines in Figure 4 through the positions shown in dotted lines, the valve 32 is operated from its closed position through partially open intermediate positions to a fully open position. In operation, the conduit 30 under the control of regulating valve 32 operates to transfer hydraulic fluid from one end to the other of the cylinder 13 in response to a coil rolling into engagement with the stops 10. Adjustment of the valve 32 regulates the rate at which fluid is transferred from one end to the other of the cylinder 13 and thereby the yielding effect of its hydraulic resistance to lowering movement of the stops 10, and such regulation is made in accordance with the size of coils being handled. By proper regulation of the valve 32, large coils can be arrested at the same rate of speed as a small coil. However, no fluid will move through the by-pass 30 when the valve 32 is closed and, in such case, the stops 10 will not lower to a retracted position upon engagement by a coil.

A pressure relief conduit 34 provides a connection for the conduit 24 with the exhaust line 22 for transferring excess fluid from supply line 21 to exhaust after the piston rod 17 is moved to its fully retracted position by appropriate operation of the 4-way valve 23. A check valve 35, preferably one having a manually adjustable biasing spring, confines the flow of fluid in the conduit 34 to the direction indicated. A similar pressure relief conduit 36 connects the conduit 25 to the exhaust line 22. It has a manually adjustable orifice valve 37 and a manually adjustable pressure relief valve 38 for controlling the flow of fluid therethrough.

In order to prevent settling movement of the stops 10 toward their retracted position during periods of long inactivity, the check valves 31 and 35 and the pressure relief valve 38 are adjusted to operate only when subjected to pressures, for example, in excess of 100 lbs. per sq. in. The pressure relief valve 38 must of course be adjusted for operation only at pressures sufficiently high that it will not interfere with the operation of the by-pass conduit 30 when its control lever 33 is in one of the partially open positions shown in dotted lines and the valve 32 is operating to control the lowering movement of the stops 10.

From the foregoing, it will be apparent that the apparatus of this invention is effective to retard the movement of a coil over the ramp 2. Attention is particularly directed to the fact that transfer of fluid through the by-pass conduit 30 in response to movement of a coil into engagement with the stops 10 is effective to absorb kinetic energy from a rolling coil and thereby slow its speed of movement with a yielding action. In this respect, it will be noted that the rate at which a coil of a given size is retarded may be varied by adjusting the regulating valve 32 by manual operation of its control lever 33. In addition, operation of the control lever 33 is effective, as explained above, to arrest coils of different sizes at the same rates of speed. In this manner, the charging buggy 1 or other receiving station is protected against damage from impact due to articles being deposited thereon at excessive speeds.

While one embodiment of my invention has been shown and described it will be apparent that other adaptations and modifications may be made without departing from the scope of the following claims.

I claim:
1. In apparatus for handling coils of metal strip including a charging buggy for receiving and transferring the coils for subsequent processing operations, the combination comprising a downwardly inclined ramp over which the coils are delivered by rolling to said buggy, and means controlling the speed of rolling movement of a coil onto said buggy comprising a shaft arranged below and extending transversely of said ramp at the lower end thereof, bearings supporting said shaft for rotational movement therein, a plurality of stops keyed to said shaft at spaced intervals along its length for movement thereby between an erected position in the path of movement of a coil over said ramp and a retracted position out of said path of coil movement, said ramp having openings at laterally spaced points corresponding to the location of said stops and providing for their movement between said erected and retracted positions, and means controlling the rotation of said shaft and thereby the lowering movement of said stops from said erected positions to said retracted positions comprising a crank on said shaft, a double-acting expansible chamber hydraulic motor having fluid pressure conduits connected to opposite ends thereof and an operating connection with said crank, reversing valve means connected with said conduits for reversing the operation of said motor and for blocking said conduits against the exhaust of hydraulic fluid from both ends thereof, a by-pass conduit interconnecting said motor conduits at a point intermediate said reversing valve and motor and through which hydraulic fluid is forced in response to engagement of said stops by a coil rolling downwardly over said ramp, and an adjustable throttle valve in said by-pass conduit for regulating the forced flow of fluid therethrough and thereby the yielding force resisting movement of said stops to their retracted positions.

2. The combination with a downwardly inclined ramp over which cylindrical articles roll to a receiving station, of a rotatable shaft extending transversely of said ramp at the lower end thereof, a stop mounted on said shaft for movement thereby between an erected position in the path of rolling movement of an article over said ramp and a retracted position out of its said path of movement, and means controlling the rotation of said shaft and thereby the lowering movement of said stop from said erected position to said retracted position comprising a crank on said shaft, a double-acting expansible chamber hydraulic motor having fluid pressure conduits connected to opposite ends thereof and an operating connection with said crank, reversing valve means connected with said conduits for reversing the operation of said motor and for blocking said conduits against the exhaust of hydraulic fluid from both ends thereof, a by-pass conduit interconnecting said motor conduits at a point intermediate said reversing valve and motor and through which hydraulic fluid is forced in response to engagement of said stop by an article rolling downwardly over said ramp, and an adjustable throttle valve in said by-pass conduit for regulating the forced flow of fluid therethrough and thereby the yielding force resisting movement of said stop to its retracted position.

References Cited in the file of this patent

UNITED STATES PATENTS

| | | |
|---|---|---|
| 1,979,466 | Hedenskoog | Nov. 6, 1934 |
| 2,292,753 | Gerald | Aug. 11, 1942 |
| 2,505,932 | Anderson | May 2, 1950 |
| 2,624,440 | Hornberger | Jan. 6, 1953 |
| 2,665,131 | Schlafender | Jan. 5, 1954 |